(12) United States Patent
Thompson

(10) Patent No.: US 6,848,910 B1
(45) Date of Patent: Feb. 1, 2005

(54) METHOD AND SYSTEM FOR ASSISTING MEMORY

(76) Inventor: Debra Raisner Thompson, 6 Griggs Rd., Brookline, MA (US) 02446

( * ) Notice: Subject to any disclaimer, the term of this patent is extended or adjusted under 35 U.S.C. 154(b) by 0 days.

(21) Appl. No.: 10/703,126

(22) Filed: Nov. 6, 2003

(51) Int. Cl.⁷ .............................................. G09B 19/00
(52) U.S. Cl. ........................................................ 434/236
(58) Field of Search ................................. 434/219, 236, 434/238, 433; 63/3, 15, 15.1, 15.2, 15.3, 33

(56) References Cited

U.S. PATENT DOCUMENTS

| | | | | |
|---|---|---|---|---|
| 581,549 A | * | 4/1897 | Goetz | 63/1.13 |
| 732,532 A | * | 6/1903 | Fallek | 63/15 |
| 784,623 A | * | 3/1905 | Whitsett | 4/284 |
| 1,087,015 A | * | 2/1914 | Heylmun | 63/1.13 |
| 1,130,917 A | * | 3/1915 | Meyer | 63/1.12 |
| 1,176,025 A | * | 3/1916 | Bohlim | 24/13 |
| D145,318 S | * | 7/1946 | Lowenst | D11/2 |
| 2,510,224 A | * | 6/1950 | Hettinger | 40/633 |
| 4,351,166 A | * | 9/1982 | Belin | 63/15 |
| D357,641 S | * | 4/1995 | Grodin | D11/2 |
| 6,279,244 B1 | * | 8/2001 | Kelley | 33/514.1 |

* cited by examiner

Primary Examiner—Kurt Fernstrom
(74) Attorney, Agent, or Firm—Cantor Colburn LLP

(57) ABSTRACT

A method and system for assisting memory includes first and second rings for encircling a human finger and a ring holder having a first end and a second end connectable to form a closed loop, wherein the rings are threaded onto the ring holder and wherein the first end and the second end are separable from each other for removing at least one of the rings. A method of assisting memory includes determining a task to be remembered, selecting a ring, opening the ring holder, removing a selected ring from the ring holder, closing the ring holder, placing the selected ring on a finger, and viewing the selected ring on the finger for remembering the task. A packaged memory assisting system includes the rings and ring holder and a card, the card having a first slot, the ring holder threaded through the first slot, wherein the ring holder is closed for preventing the rings from falling off the ring holder.

18 Claims, 3 Drawing Sheets

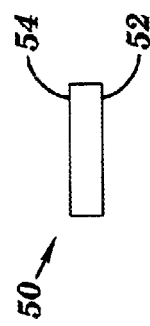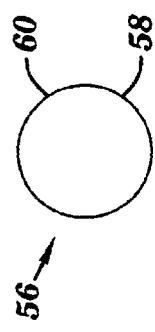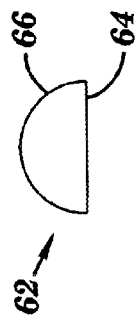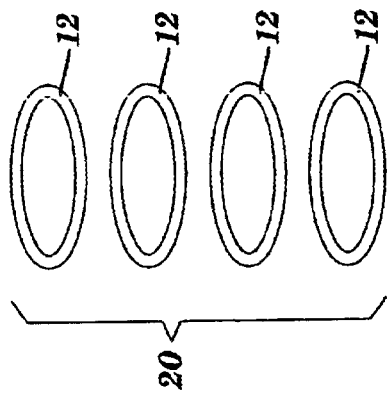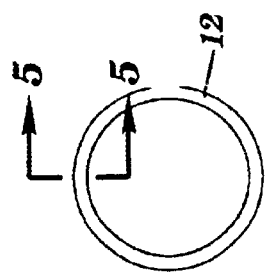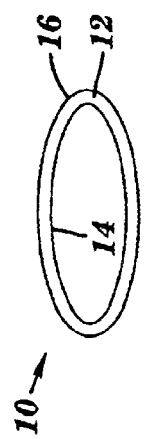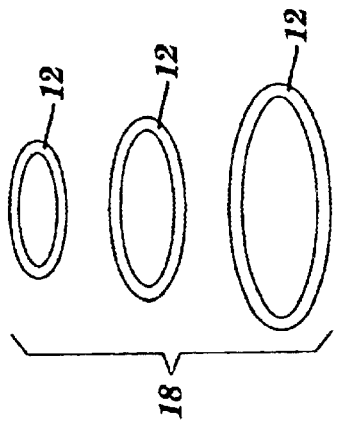

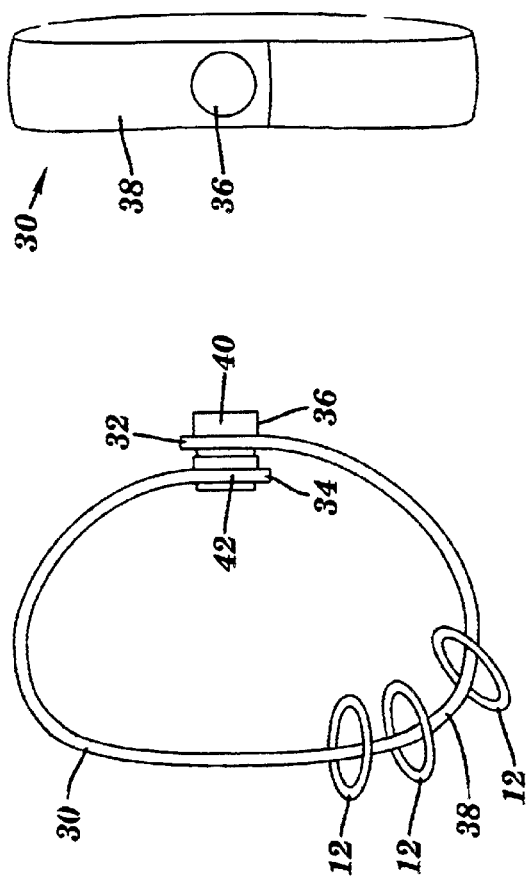
FIG. 6
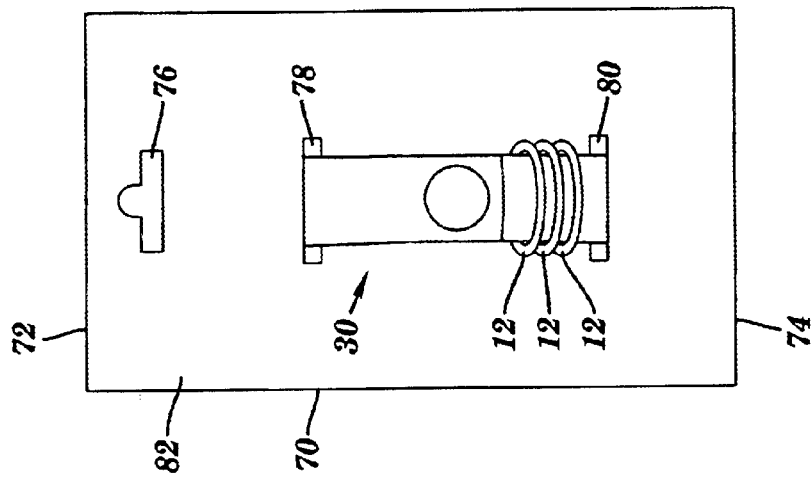
FIG. 7
FIG. 8

METHOD AND SYSTEM FOR ASSISTING MEMORY

TECHNICAL FIELD

This invention relates generally to a memory assisting device. More particularly, this invention relates to a method and a system of using a wearable memory assisting device.

BACKGROUND

Remembering important tasks throughout the day can be a challenge when so many other daily events are taking place. The practice of providing one self with a memory assisting device can sometimes alleviate the need to actually remember what needs to be done.

One method of assisting memory which may have been used in the past was to tie a string around one's finger. While visible throughout the day, the ability to tie a string around one's own finger is virtually impossible and requires the assistance of a second person. Also, providing such a string requires the user to first find a string and cut it to the appropriate length. String, typically made of cloth fibers, can also get quite dirty during the day and wet and soggy when hands are washed. Furthermore, because the string needs to be tied, such a string can be bulky and chaffing. Thus, tying a string around one's finger has some considerable disadvantages.

The practice of making a list on a piece of paper can be helpful to some. The paper list, however, must be placed somewhere where it will not be lost, such as a pocket. When hidden in a pocket, the user may forget to consult the list, and therefore its use as a memory assisting device is negated. Such paper lists may also be easily torn and ruined, and not usable day after day. Some people may find the use of a handheld computerized organizer helpful. While more durable and versatile than a paper list, such organizers can be very expensive and again the user must remember to consult the organizer at critical times in order for the organizer to be of value in memory assistance. If lost, all of the user's personal information is gone and available to the person who locates the organizer, which can create a potentially dangerous situation. Thus, paper lists and computerized organizers have their own set of disadvantages when it comes to memory assistance.

SUMMARY

The above discussed and other drawbacks and deficiencies of the prior art are overcome or alleviated by a memory assisting system including a first ring for encircling a human finger, a second ring for encircling a human finger, and a ring holder having a first end and a second end connectable to form a closed loop, wherein the first ring and the second ring are threaded onto the ring holder and wherein the first end and the second end are separable from each other for removing at least one of the first ring and second ring.

The above discussed and other drawbacks and deficiencies of the prior art are also overcome or alleviated by a method of assisting memory including providing a memory assisting device having a ring holder and a plurality of rings, determining a task to be remembered, selecting a ring from the plurality of rings, opening the ring holder, removing a selected ring from the ring holder, closing the ring holder, placing the selected ring on a finger, and viewing the selected ring on the finger for remembering the task.

The above discussed and other drawbacks and deficiencies of the prior art are also overcome or alleviated by a packaged memory assisting system including a plurality of rings sized for encircling a human finger, an openable and closable ring holder, the plurality of rings threaded onto the ring holder, and a card, the card having a first slot, the ring holder threaded through the first slot, wherein the ring holder is closed for preventing the rings from falling off the ring holder.

Other systems and methods according to embodiments will be or become apparent to one with skill in the art upon review of the following drawings and detailed description. It is intended that all such additional systems and methods be included within this description, be within the scope of the present invention, and be protected by the accompanying claims.

The above described and other features are exemplified by the following figures and detailed description.

DRAWINGS

Referring to the exemplary drawings wherein like elements are numbered alike in the several FIGS.:

FIG. 1 shows a perspective view of a ring of the memory assisting device;

FIG. 2 shows a perspective view of a set of rings of the memory assisting device;

FIG. 3 shows a perspective view of a set of rings of the memory assisting device;

FIG. 4 shows a top plan view of a ring of the memory assisting device

FIGS. 5A–5C show alternate cross-sectional views of the ring of the memory assisting device of FIG. 4, taken along line 5—5 of FIG. 4;

FIG. 6 shows a side plan view of a ring holder with rings of the memory assisting device;

FIG. 7 shows a front perspective view of the ring holder of FIG. 6;

FIG. 8 shows an embodiment of a packaging card for the ring holder and rings of the memory assisting device; and, FIG. 9 shows an alternate embodiment of a packaging card for the ring holder and rings of the memory assisting device.

DETAILED DESCRIPTION

Figure 9:
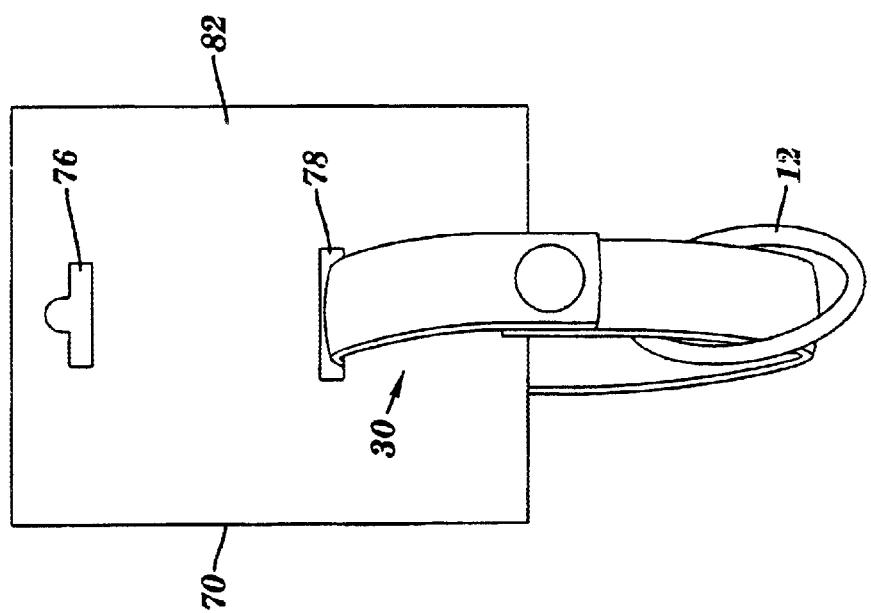

Turning now to FIG. 1, a memory assisting device 10 in the shape of a ring 12 is shown. The ring 12 has an inner periphery 14 sized for encircling an average human finger. The inner periphery may have an average diameter in the range of 0.25 to 1.5 inches, however diameters on the outside of this range may also be within the scope of this invention if a larger size is needed for unusually large sized fingers and if smaller sizes are used when the ring 12 is made from expandable material. The ring 12 may be circular shaped as shown in FIG. 4, however the ring 12 may also be flexible so that any particular finger shape cross-section may be accommodated. For providing flexibility to the ring 12, the ring 12 may be made from materials including elastic, rubber, plastic, wire, springs, cloth covered elastic bands, etc., or any other material which would provide flexibility and comfort to the wearer of the memory assisting device 10. In addition to flexibility, the ring 12 may also be provided with the ability to expand and contract such that fingers of varying sizes may comfortably wear the same ring 12. Stretchable materials for forming the ring 12 may include elastic, springs, rubber bands, polymers, etc. While specific materials are disclosed, it should be understood that combinations of materials may be utilized, as well as alternate materials not specifically listed.

As shown in FIG. 2, the memory assisting device 10 may include a set 18 of rings 12. In the set 18, while three rings 12 are shown, there may be more or less rings 12 in the set. The set 18 may include rings 12 of differing sizes such that varying finger sizes may be accommodated. As different sized rings 12 are provided, the rings 12 may be made of a non-stretchable material. Alternatively, the different sized rings 12 may be made of stretchable material.

As shown in FIG. 3, the memory assisting device 10 may include a set 20 of rings 12. The rings 20 may be the same size as shown, or, alternatively, may be of varying sizes as in set 18. In the set 20, at least one ring 12 may have a different coloring or distinguishing feature than the other rings 12. A distinguishing feature may include a stripe or stripes, notch or notches, pattern, wave, texture, or any other visual or tactile distinguishing characteristic or may be made from a different material. While each ring 12 may be different from the rest, it is also within the scope of this invention to have some rings 12 similar to other rings 12 in the set 20. By example only, the set 20 may include two black rings and two white rings, or may include a red ring, an orange ring, a yellow ring, and a green ring. A ring 12 with a distinguishing characteristic, whether a color, material, pattern, or tactile identifier, may be assigned a particular task by the wearer of the ring. The user is also able to wear a plurality of rings 12, where each ring 12 may be assigned a different task as desired. While four rings 12 are shown in set 20, more or less rings may be present within set 20.

While the ring 12 is ring-shaped in periphery, as shown in FIGS. 1 and 4, a cross-section of ring 12, taken along line 5—5 from FIG. 4, may reveal a rectangular shape 50 shown in FIG. 5A such that the ring 12 is worn flat against a finger, with a flat inner surface 52 defining the inner periphery 14, and a flat outer surface 54 defining the outer periphery 16. Alternatively, as shown in FIG. 5B, the cross-section may be a circular shape 56 with continuous rounded inner and outer surfaces 58, 60 that define the inner and outer peripheries 14, 16, respectively. Alternatively, as shown in FIG. 5C, the cross-section may be a semi-circular shape 62 and have a flat inner surface 64 defining the inner periphery 14 and a rounded outer surface 66 defining the outer periphery 16. Other cross-sections are also within the scope of the memory assisting device 10.

Turning now to FIGS. 6–7, a ring holder 30 is shown with rings 12. While three rings 12 are shown on the ring holder 30, there may be more or less rings 12 at any given time upon the ring holder 30. The ring holder 30 may include a flexible band 38. The ring holder 30 may include a first end 32 and a second end 34. While a band 38 is shown with a rectangular cross-section, any shape band would be within the scope of the invention, including, but not limited to, bands with circular, oval, semicircular, triangular, and other polygonal cross-sections. Also, while a solid band 38 is shown, the ring holder 30 may include any sort of strap that is closeable in a loop, such as a chain link, coil, or any other strap fashionable into a loop. The first end 32 and the second end 34 of the band 38 may be securable together, using a securement device 36, to form a closed loop. The securement device 36 may be a snap, where snap half 40 is provided adjacent the first end 32 and snap half 42 is provided adjacent the second end 34. Snap halves 40, 42 may include a male portion and a female portion which are joinable together in a secure yet removable connection. Alternatively, the securement device 36 may include hook and loop fasteners, hook and eye fasteners, magnets, clips, watch style belt with holes and an insertable pin, or any other securement device which would provide a removable connection to the closed loop of the ring holder 30.

While a flexible band 38 is shown, it should be understood that the band 38 may be relatively inflexible, such as a key ring, as long as there is at least one location where the rings 12 may be threaded onto the band 38, and prevented from falling off of the band 38. In order to accommodate a plurality of rings 12, the band 38 may have a diameter in the range of 0.75 inches to 6 inches, and more specifically, the band 38 may have a diameter in the range of 1.5 inches to 2.5 inches.

In use, the ring holder 30 may be opened by disengaging the first end 32 from the second end 34 of the flexible band 38. The rings 12 may be threaded onto the band 38, as shown in FIG. 6. For that purpose, the band 38 or other strap as described above, should have a cross-section which is smaller than an internal cross-section of the rings 12. For storing the ring holder 30, the band 38 may be wrapped around any convenient object, such as a purse strap, a key ring, a door knob, a wrist, etc. and secured tightly using a securement device 36 so that the rings 12 are not lost. When one or more tasks for remembering are determined, the user may select a ring or rings from the ring holder 30 and place the ring or rings 12 on the user's finger or fingers. When the task is completed, the ring 12 may be removed from the finger and replaced on the ring holder 30. If the ring 12 is lost after removal, replacement rings 12 may be available on the ring holder 30 for the next task to remember.

When wrapped around a wrist, the ring holder 30 with rings 12 double as a unique and changeable bracelet, and may be colored and styled accordingly. Also, the rings 12, while serving the function of a memory assisting device, are worn as rings and therefore may be styled as jewelry. Accordingly, different sets of rings and ring holders may be packaged for different uses and occasions. By example only, holiday sets may be packaged with the colors of the season, such as red, white, and pink for Valentines Day, pink, lilac, baby blue, and light green rings for Easter, red, white, and blue for July $4^{th}$, orange and black for Halloween, and red, green, and gold rings for Christmas. Also by example only, special events may be commemorated with special ring sets, such as white and black for weddings, light colors for expectant parents, and rainbow colors for birthdays. Also by example only, different styles may be packaged for differing tastes, such as sets of fluorescent rings, sets of gold and/or silver rings, sets of neutral colored rings for professionals, and sets of patterned rings or rings with pictures of popular characters for children. While the rings 12 may be designed for special occasions and tastes, so may the ring holder 30.

As shown in FIG. 8, for packaging the ring holder 30 and rings 12 for sale, a card 70 made from paperboard, cardboard, laminated backing, plastic or other relatively inexpensive material may be cut in a desired shape for marketing, such as the rectangle shown. The card 70 may include a top end 72 and a bottom end 74. An aperture 76 may be punched into the card 70 adjacent the top end 72 for hanging the card on a hook. The card 70 may further include a pair of slots 78, 80 spaced apart within the card 70 between the aperture 76 and the bottom end 74. The ring holder 30 may be weaved through the slots 78, 80 such that the securement device 36 and the rings 12 are visible from the front 82 of the card 70 for viewing by shoppers. The front 82 of the card 70 may also be used for advertising the memory device 10.

FIG. 9 shows an alternate embodiment of the card 70 which includes a slot 78, but not the slot 80. In this embodiment, the amount of material required for the card 70 is less and the assembly of the product onto the card 70 is simplified slightly by only requiring one threading operation of the ring holder 30 onto the card 70. The card 70 shown in FIG. 8, however, provides more room for graphics, identifiers, and other marketing indicia upon the front 82.

While card 70 is shown for packaging the memory assisting device 10 for sale, other styles of cards or packaging setups may be used for preparing the memory assisting device 10 for sale. The particular card or package chosen may be based on intended store and expected consumer, and sized according to space availability.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A memory assisting system comprising:
   a first ring for encircling a human finger;
   a second ring for encircling a human finger; and,
   a ring holder having a first end and a second end connectable to form a closed loop, wherein the ring holder is sized for encircling a human wrist, wherein the first ring and the second ring are threaded onto the ring holder and wherein the first end and the second end are separable from each other for removing at least one of the first ring and second ring.

2. The memory assisting system of claim 1 wherein the first ring includes at least one feature distinguishing it from the second ring.

3. The memory assisting system of claim 2 wherein the first ring is a different color than the second ring.

4. The memory assisting system of claim 2 wherein the first ring is a different size than the second ring.

5. The memory assisting system of claim 1 wherein a diameter of the first and second ring is in the range of 0.25 to 1.5 inches.

6. The memory assisting system of claim 1 wherein the first ring and the second ring are flexible.

7. The memory assisting system of claim 1 wherein the first ring and the second ring are formed from a stretchable material.

8. The memory assisting system of claim 1 wherein the ring holder includes a securement device, a first portion of the securement device positioned on the first end of the ring holder, a second portion of the securement device positioned on the second end of the ring holder, wherein the first portion and the second portion are removably securable together for opening and closing the loop of the ring holder.

9. The memory assisting system of claim 8 wherein the securement device is a snap.

10. The memory assisting system of claim 1 wherein the ring holder is flexible.

11. The memory assisting system of claim 1 wherein the ring holder has a diameter in the range of 0.75 to 6 inches.

12. A method of assisting memory comprising:
    providing a memory assisting device having a ring holder and a plurality of rings;
    determining a task to be remembered;
    selecting a ring from the plurality of rings;
    opening the ring holder;
    removing a selected ring from the ring holder;
    looping the ring holder around a wrist;
    closing the ring holder;
    placing the selected ring on a finger; and,
    viewing the selected ring on the finger for remembering the task.

13. The method of claim 12 further comprising:
    completing the task;
    removing the selected ring from the finger;
    opening the ring holder;
    threading the selected ring onto the ring holder; and,
    closing the ring holder.

14. The method of claim 12 further comprising looping the ring holder around an accessible object.

15. The method of claim 12 wherein closing the ring holder comprises securing the ring holder in a closed loop configuration with a securement device.

16. The method of claim 12 wherein the selected ring is a first ring and the finger is a first finger, the method further comprising determining a second task to be remembered, selecting a second ring from the ring holder, the second ring having a feature distinguishing it from the first ring, and placing the second ring on a second finger.

17. A packaged memory assisting system comprising:
    a plurality of rings, each ring sized for encircling a human finger;
    an openable and closable ring holder, the ring holder having a first end and a second end connectable to form a closed loop, the plurality of rings threaded onto the ring holder, wherein the ring holder is sized for encircling a human wrist and wherein the first end and the second end are separable from each other for removing at least one of the plurality of rings; and,
    a card, the card having a first slot, the ring holder threaded through the first slot, wherein the ring holder is closed for preventing the rings from falling off the ring holder.

18. The packaged memory assisting system of claim 17 wherein the card further includes a second slot, the ring holder threaded through the second slot, wherein the ring holder includes a securement device visible from a front of the card, and wherein the plurality of rings are positioned on the ring holder between the first and second slots.

* * * * *